(12) United States Patent
Kiehlbauch et al.

(10) Patent No.: US 7,250,114 B2
(45) Date of Patent: Jul. 31, 2007

(54) METHODS OF FINISHING QUARTZ GLASS SURFACES AND COMPONENTS MADE BY THE METHODS

(75) Inventors: Mark W. Kiehlbauch, Hayward, CA (US); John E. Daugherty, Newark, CA (US)

(73) Assignee: Lam Research Corporation, Fremont, CA (US)

( * ) Notice: Subject to any disclaimer, the term of this patent is extended or adjusted under 35 U.S.C. 154(b) by 85 days.

(21) Appl. No.: 10/448,422

(22) Filed: May 30, 2003

(65) Prior Publication Data

US 2004/0238487 A1    Dec. 2, 2004

(51) Int. Cl.
*B44C 1/22* (2006.01)
*H01L 21/00* (2006.01)

(52) U.S. Cl. .............. 216/31; 216/52; 216/83; 216/88; 134/3; 438/905

(58) Field of Classification Search ............. 216/31, 216/52, 83, 88; 156/345.1, 345.12; 438/905; 134/3
See application file for complete search history.

(56) References Cited

U.S. PATENT DOCUMENTS

| 4,274,907 A | 6/1981 | Vig et al. |
| 4,445,523 A | 5/1984 | Brüning et al. |
| 4,456,336 A * | 6/1984 | Chung et al. ............... 349/160 |
| H532 H * | 10/1988 | Brandmayr ............... 216/88 |
| 5,087,481 A * | 2/1992 | Chen et al. ............... 427/129 |
| 5,654,057 A | 8/1997 | Kitayama et al. |
| 6,150,006 A | 11/2000 | Hellmann et al. |
| 6,306,489 B1 | 10/2001 | Hellmann et al. |
| 6,376,977 B1 | 4/2002 | Kawai et al. |
| 6,544,893 B2 * | 4/2003 | Eto ............... 438/693 |
| 6,855,576 B2 | 2/2005 | Yamaguchi et al. |
| 2001/0023082 A1 | 9/2001 | Vepa et al. |
| 2002/0104332 A1 * | 8/2002 | Ruppert et al. ............... 65/421 |
| 2002/0153349 A1 * | 10/2002 | Okumura et al. ............. 216/57 |

FOREIGN PATENT DOCUMENTS

| EP | 0322967 A | 12/1988 |
| JP | 2002288821 A | 10/2002 |
| WO | 98/27020 A | 6/1998 |
| WO | 01/19746 A | 3/2001 |
| WO | 02/11166 A | 2/2002 |

OTHER PUBLICATIONS

International Search Report and Written Opinion dated Dec. 7, 2004 for PCT/US2004/016857.
International Preliminary Report on Patentability dated Dec. 1, 2005 for PCT/US2004/016857.

* cited by examiner

*Primary Examiner*—Shamim Ahmed
(74) *Attorney, Agent, or Firm*—Buchanan Ingersoll & Rooney PC

(57) ABSTRACT

Methods of surface finishing a component useful for a plasma processing apparatus are provided. The component includes at least one plasma-exposed quartz glass surface. The method includes mechanically polishing, chemically etching and cleaning the plasma-exposed surface to achieve a desired surface morphology. Quartz glass sealing surfaces of the component also can be finished by the methods. Plasma-exposed surface and sealing surfaces of the same component can be finished to different surface morphologies from each other.

10 Claims, 8 Drawing Sheets

FIRST QUARTZ GLASS FINISHING FLOW CHART

Mechanically Polish Quartz Surface(s)

Chemically Etch Quartz Glass Surface(s)

Clean Quartz Glass Surface(s)

METHODS OF FINISHING QUARTZ GLASS SURFACES AND COMPONENTS MADE BY THE METHODS

BACKGROUND

Plasma processing apparatuses are used to perform processes including plasma etching of substrates made of semiconducting, dielectric and metallic materials, physical vapor deposition, chemical vapor deposition (CVD), ion implantation and resist removal.

Plasma processing apparatuses include components that are exposed to plasma environments. In view of the desire to increase process yields, there is a need for plasma-exposed components that provide for reduced particle contamination in such plasma environments.

SUMMARY

Methods for finishing quartz glass surfaces are provided. The methods can produce quartz glass surface finishes that reduce the incidence of quartz and metal particulate, and molecular metal contamination when used in plasma processing apparatuses. Components having such finished quartz glass surfaces are also provided.

A preferred embodiment of a method of surface finishing a component including at least one quartz glass surface comprises mechanically polishing at least one quartz glass surface of the component, chemically etching the mechanically polished quartz glass surface, and cleaning the etched quartz glass surface to remove metal contaminants from the surface.

Components finished by preferred embodiments of the methods include at least one plasma-exposed quartz glass surface. The components can also include at least one non-plasma-exposed quartz glass surface, such as a vacuum sealing surface. Plasma-exposed surfaces of the components can be finished to a different surface morphology than non-plasma-exposed surfaces. The finished components can be used in plasma processing apparatuses to provide for reduced contamination of substrates.

Methods of surface finishing components preferably achieve low levels of metal contaminants on quartz glass surfaces. The components preferably can provide for reduced metal particulate and molecular metal contamination of substrates when used in plasma processing apparatuses.

Preferred embodiments of the methods can be used to finish components that have either been previously exposed, or have not been previously exposed, to plasma in the plasma processing apparatus.

Preferred embodiments of methods of etching semiconductor substrates in a plasma chamber of a plasma processing apparatus, which contains one or more components that have been finished as described above, are also provided.

DETAILED DESCRIPTION

Particle performance is a concern in the processing of various materials, such as semiconductor materials, dielectric materials and metals, in plasma processing apparatuses. Particulate contaminants that adhere to substrates processed in plasma reactors can reduce product yield. One source of particulate contamination in plasma reactors is a plasma exposed surface of a component.

Figure 1:
FIG. 1 is an SEM micrograph (at 1000×) of a slurry-polished quartz glass surface.

Components including plasma-exposed surfaces can be made by processes including sintering and/or machining of one or more surfaces of the components. These steps result in damage to the surfaces, leaving the surfaces fractured and discontinuous. These fractures are a potential source of particle generation during plasma processing. Slurry polishing can reduce the size of the particles; however, it does not eliminate the particles. FIG. 1 is a scanning electron microscope (SEM) micrograph of a surface of a quartz glass dielectric window that has been slurry-polished. Quartz glass surfaces that have been machined by other techniques have damage similar to that shown in FIG. 1.

Figure 2:
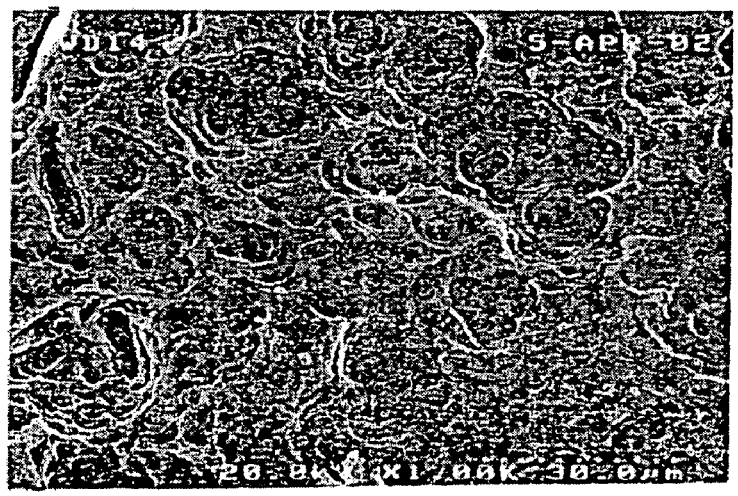
FIG. 2 is an SEM micrograph (at 1000×) of a quartz glass surface that has been slurry-polished and plasma conditioned.

It has also been determined that components made of quartz glass can be installed in a plasma reactor and conditioned before achieving production conditions for semiconductor substrates in the plasma reactor, in order to reduce the incidence of quartz-related particulate contamination of the substrates. Conditioning wafers may be installed in the plasma reactor during conditioning. The plasma removes material from the plasma-exposed surfaces of the components by etching. Plasma-exposed surfaces preferably have a morphology that reduces quartz and metal particulate. Eventually, enough quartz material is removed by the conditioning treatment to achieve an acceptable surface quartz particulate level. FIG. 2 is an SEM micrograph of a surface of a quartz glass dielectric window that has been slurry-polished and then conditioned in a plasma reactor by plasma exposure (50 hours).

However, conditioning treatments require many hours of lost production time, and can require up to ten or more days, to produce a suitable surface finish on plasma-exposed surfaces of components for use in plasma processing. Accordingly, such conditioning treatment requires significant down time of the plasma reactor in order to achieve suitable particle performance by the components. In addition, the conditioning treatment requires associated expenses, including the costs of conditioning wafers, operator monitoring, and intervention.

In addition, surfaces of quartz glass components that need to provide a vacuum seal in plasma reactors to prevent air flow paths in a plasma processing chamber, i.e., sealing surfaces (for example, O-ring sealing surfaces), need to have a finish that provides suitable vacuum sealing performance. Such sealing surfaces are not plasma-exposed surfaces. However, a desirable vacuum seal surface finish can be significantly different from a desirable plasma-exposed surface. It has been determined that components having both plasma-exposed and vacuum seal surfaces preferably should have significantly different surface finishes at these different locations on the same component.

Figure 3:
FIG. 3 shows a flow chart of a first preferred embodiment of a quartz glass finishing process.
Figure 3:

FIG. 3 shows a flow chart of a first preferred embodiment of a method of surface finishing quartz glass. The method can be practiced to finish one or more quartz glass surfaces of a component useful for a plasma processing apparatus. The one or more finished surfaces preferably include at least one surface that is exposed to plasma when the component is installed in a plasma reactor. The component can be a gas injector, dielectric window, electrode, view port, edge ring, focus ring, confinement ring, or the like, for a plasma reactor.

Preferred embodiments of the methods of finishing quartz glass can be used to finish quartz glass surfaces of components made of quartz glass, as well as quartz glass surfaces (for example, coatings) of components that may comprise materials other than quartz glass.

The method preferably includes mechanical polishing, chemical etching, and cleaning steps to produce a desired surface finish on a component. Components that can be processed by the method can have various shapes, such as plate shapes, disk shapes, ring shapes (for example, dielectric windows, view ports, edge rings, and the like), and cylindrical shapes, and surfaces having combinations of different shapes. The components can have various sizes.

The quartz glass components are preferably made of flame-fused natural quartz. Flame-fused natural quartz is typically available in the form of boules, which can be processed to the desired shape and size. The quartz glass can alternatively be arc-fused natural quartz, or synthetic quartz, for example.

Prior to performing the finishing treatment, the quartz glass material preferably has a bulk purity level of any metal of less than about 10 ppm. This metal purity level in quartz glass can provide a metal level resulting from the bulk that is much lower than the surface metal level. Reducing the impurity level of metals in the quartz glass material reduces the incidence of particles and/or on-substrate defects related to the metals.

Quartz glass components that may be finished by preferred embodiments of the method can be in a machined and/or sintered condition. For example, plate-shaped quartz glass components can be cut from a boule and machined to a desired shape. Machined and/or sintered components can be machined to a desired configuration and surface condition using any suitable process, such as diamond grinding, or the like.

The quartz glass components are preferably mechanically polished to a desired surface finish. The mechanical polishing preferably involves slurry-polishing one or more surfaces of the component to a desired surface finish. The slurry can contain a suitable abrasive material including, for example, aluminum oxide, silicon carbide, diamond, cerium oxide, zirconium oxide, or the like. The abrasive material preferably has a particle size that produces a desired surface finish level on the slurry-polished surface(s) of the component.

The mechanical polishing of the quartz glass component preferably can achieve the same surface finish, or alternatively can achieve a different surface finish, at different surface locations of the component. For example, one or more plasma-exposed surfaces of the component can be mechanically polished to a different surface finish than one or more non-plasma-exposed surfaces (for example, sealing surfaces).

The mechanical polishing preferably achieves a desired quartz glass surface morphology prior to chemical etching so that the etching achieves a surface morphology similar to a plasma-exposed surface. For example, the etched surface preferably has the same effective surface area, and is essentially damage-free and fracture-free. The mechanically polished surface morphology can be quantified, for example, by the arithmetical mean roughness, $R_a$. In a preferred embodiment, the $R_a$ of the mechanically polished surface(s) is preferably about 5-30 microinches (about 0.125-0.75 microns), and more preferably about 12-20 microinches (about 0.3-0.5 microns). For a given component, different surfaces can be mechanically polished to different finishes. For example, plasma-exposed surfaces can be mechanically polished to a lower $R_a$ value (i.e., a smoother finish), than non-plasma-exposed surfaces, for which particulate removal during plasma processing is of less concern.

The machining and mechanical polishing steps can result in fractured surfaces, which are a source of particles of quartz glass and/or metal on machined and/or mechanically polished surfaces of the component. The attached particles can be a source of particle contamination during plasma processing of substrates. Accordingly, it is desirable to reduce the number of attached particles to a suitably low count prior to the processing of substrates with the component present in the plasma reactor. As described above, attached particles can be removed from plasma reactor components by plasma conditioning techniques; however, these techniques are not completely satisfactory.

Accordingly, the etch step preferably removes attached quartz glass and metal contaminant particles from the treated component surface(s), and preferably achieves a surface morphology that is similar to that of a plasma-exposed surface. The etch step preferably uses a fluorine-containing etching liquid that is effective to etch quartz glass. For example, the fluorine-containing etching liquid can be an etching solution containing hydrofluoric acid (HF), ammonium fluoride ($NH_3HF$), ammonium bifluoride ($NH_4FHF$), or mixtures thereof. The etching liquid also can contain additives, such as nitric acid ($HNO_3$), or other acids. The concentration, temperature, and pH of the etching liquid, the etching time, and other parameters of the etching liquid and etching process, can be selected to achieve the desired rate and depth of removal of surface material from the component.

The surface morphology of the etched surface can be characterized, for example, by the $R_a$ value of the surface. The etch step preferably achieves an $R_a$ value of about 1-100 microinches (about 0.025-2.5 microns) at one or more selected surfaces of the component. As explained below, the $R_a$ value that is desired for a given component surface can vary depending on the type of component, as well as the type of surface finished (for example, plasma-exposed surfaces versus non-plasma-exposed surfaces).

By changing the surface morphology of the component by etching, the actual surface area of the component is changed. The nominal surface area of the component is determined by its physical dimensions. The actual surface area of the component additionally takes into account surface roughness. Increasing the surface roughness increases the actual surface area of a component. The chemical etching step preferably achieves a ratio of the actual surface area/nominal surface area of the component that approximates the ratio that plasma-exposed (or plasma conditioned) components can have. The chemical etching step preferably achieves a ratio of the actual surface area/nominal surface area of the component of about 1.1-4, and more preferably about 1.2-1.5.

The surface morphology of the component resulting from the etching step can also be characterized by the feature length of the surface morphology, which provides a measure of the spatial frequency of the surface roughness. The feature length of the etched surface of the component preferably is about 1-50 microns. The desired feature length value for a given surface can depend on the type of component that is finished, as well as the type of surface (for example, plasma-exposed surfaces versus non-plasma-exposed surfaces).

The cleaning step removes metal contaminants from the surface of the etched quartz glass component. The cleaning step comprises contacting the quartz glass component with a liquid having a suitably high solubility for metals that, if present, preferably are removed from the component by the cleaning. Such metals include, but are not limited to, Al, B, Ca, Cr, Cu, Fe, Li, Mg, Ni, K, Na, Ti and/or Zn. Suitable solvents that can be used for cleaning quartz glass to remove these metals include, but are not limited to, nitric acid ($HNO_3$), hydrofluoric acid (HF), phosphoric acid ($H_3PO_4$), oxalic acid $(COOH)_2$, formic acid (HCOOH), hydrogen peroxide ($H_2O_2$), hydrochloric acid (HCl), acetic acid ($CH_3COOH$), citric acid ($C_6H_8O_7$), and mixtures thereof.

In addition, to achieve the desired cleanliness level of the quartz glass parts, careful part handling, use of ultrapure solvents (for example, solvents containing less than about 10 ppb metal impurities), and environmental control, such as the use of a Class 100 cleanroom for drying and packaging, are preferred.

The cleaning step reduces the surface metal contamination level of the quartz glass component for one or more of Al, B, Ca, Cr, Cu, Fe, Li, Mg, Ni, K, Na, Ti and Zn to a desirably low level, which is preferably less than about $1,000 \times 10^{10}$ atoms/cm², more preferably less than about $100 \times 10^{10}$ atoms/cm², and most preferably less than about $10 \times 10^{10}$ atoms/cm².

Figure 4:
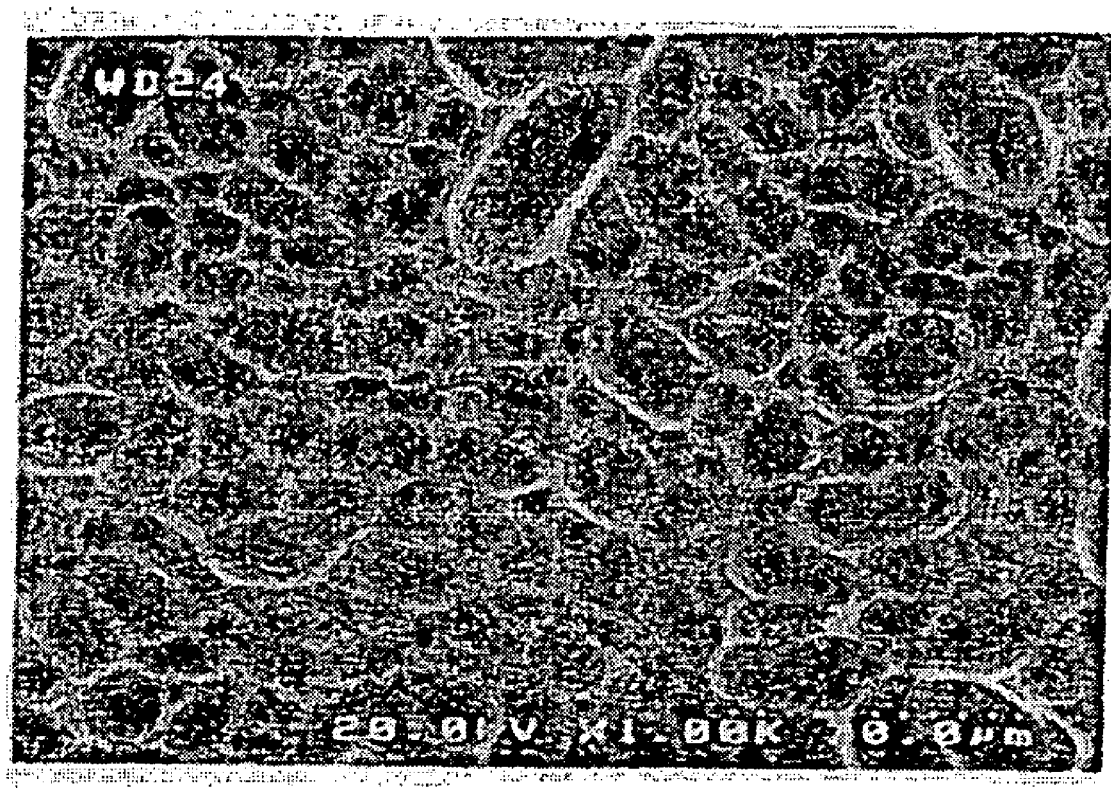
FIG. 4 is an SEM micrograph (at 1000×) of a quartz glass surface treated according to a preferred embodiment of the quartz glass finishing process.

FIG. 4 is an SEM micrograph of a surface of a quartz glass dielectric window that has been treated by mechanical polishing, etching and cleaning steps according to a preferred embodiment.

Figure 5:
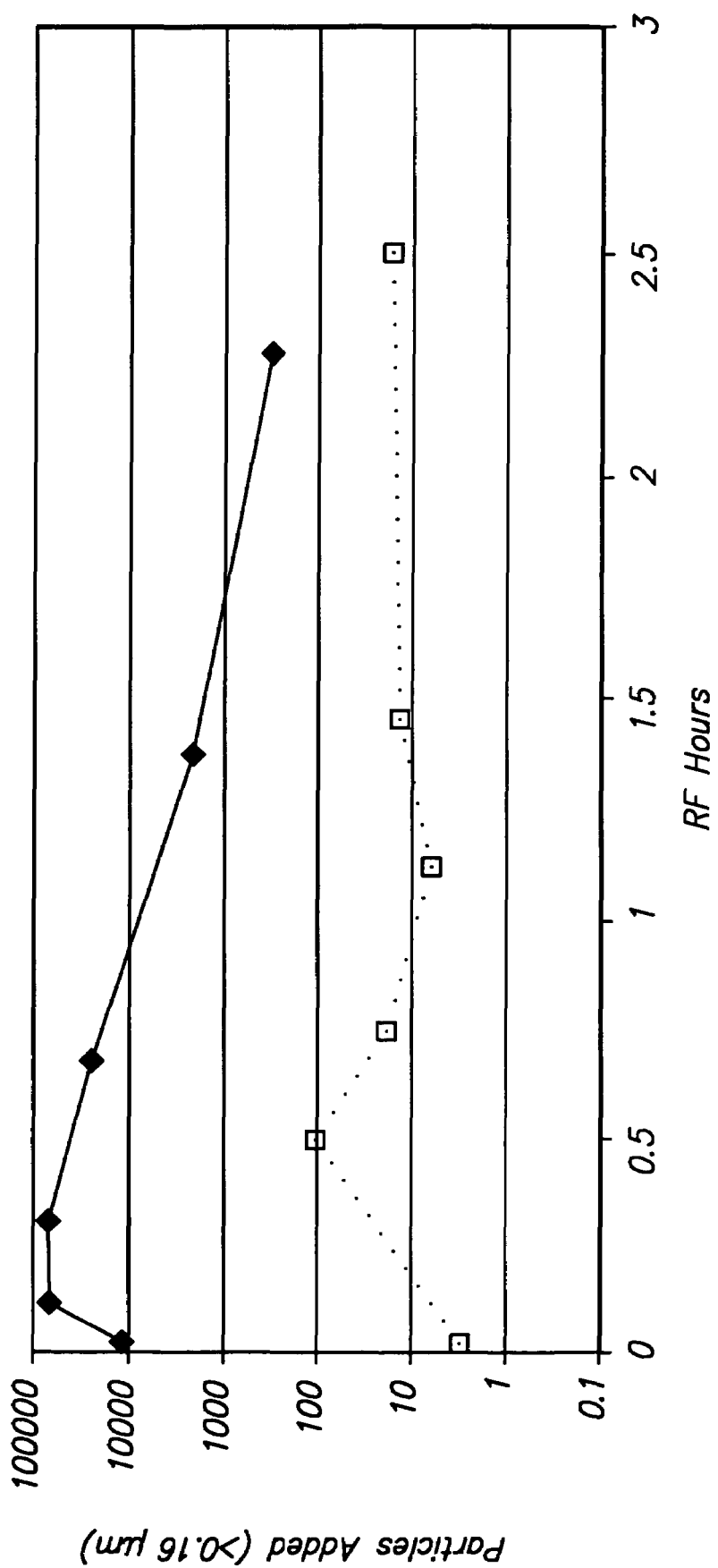
FIG. 5 shows the relationship between the number of particles added to a silicon wafer during a plasma etch process, for a quartz glass window processed according to a preferred embodiment ("□"), and for a slurry-polished quartz glass window ("♦")

FIG. 5 shows test results demonstrating the level of particle contamination (number of particles sized larger than 0.16 μm added to a silicon wafer during a plasma etching process) for a quartz glass window processed according to a preferred embodiment ("☐") compared to a slurry-polished quartz glass window ("◆"). In the curves, zero RF hours corresponds to the installation of the window in the plasma reactor. The curves show that the number of particles added by the quartz glass window finished by the preferred embodiment was much lower than the number of particles added by the slurry-polished quartz glass window over the entire test period. Most of the particles that were added by the slurry-polished quartz glass window during about the first two RF hours were quartz particles. Although the number of particles added by the slurry-polished quartz glass window was decreased by the plasma exposure, the number of these particles did not reach the lower number of particles added by the quartz glass window finished by the preferred embodiment during the test period.

Accordingly, the test results shown in FIG. 5 demonstrate that the finishing treatment can produce components for plasma processing apparatuses having finished surfaces characterized by much lower numbers of added particles when used in plasma environments, as compared to slurry-polished quartz glass windows. In addition, the test results show that only a short RF treatment (for example, about ½ hour) may be desirable for components treated according to preferred embodiments of the method in order to achieve a steady state particle level (for example, about 10 particles larger than 0.16 μm added). Accordingly, apparatus downtime and expenses associated with plasma conditioning can be significantly reduced by using components finished by preferred embodiments of the method.

Figure 6:
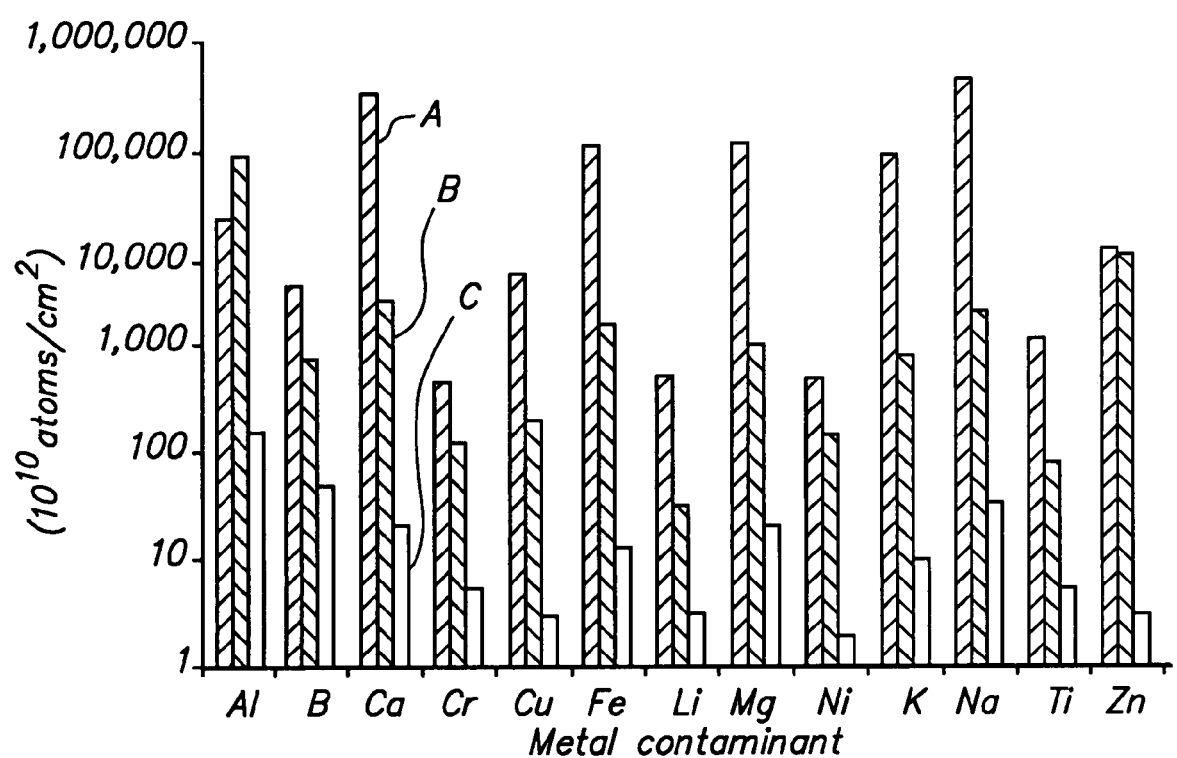
FIG. 6 shows the number of atoms/cm$^2$ of different metals on a slurry-polished quartz glass component without exposure to plasma ("A"), a slurry-polished quartz glass component that has been exposed to plasma ("B"), and a quartz glass component processed according to a preferred embodiment ("C").

FIG. 6 shows the test results for the number of atoms/cm² of Al, B, Ca, Cr, Cu, Fe, Li, Mg, Ni, K, Na, Ti, and Zn present on a slurry-polished quartz glass component without exposure to plasma ("A"), a slurry-polished quartz glass component subjected to plasma exposure ("B"), and a quartz glass component processed according the preferred embodiment ("C"), respectively. As compared to the slurry-polished quartz glass component, and the slurry-polished and plasma-exposed quartz glass component, the finishing treatment according to the preferred embodiment significantly reduced the surface metal contamination level for each of the metals. Metal contamination is undesirable because it can create defects in integrated circuits processed in a plasma reactor chamber containing contaminated quartz glass, either as particles deposited onto wafer surfaces, or as molecular contamination that diffuses into wafers and introduces undesirable impurities that adversely affect doping profiles, as well as wafer properties. Accordingly, preferred embodiments of the methods of treating quartz glass can reduce this problem.

According to a preferred embodiment, the finishing treatment can be performed to recondition parts that have previously been exposed to plasma in a plasma reactor chamber (i.e., "used parts") to achieve surface metal levels that are comparable to the levels that can be achieved by the finishing treatment for new parts, i.e., parts that have been treated by the finishing treatment, but have not been used in a plasma reactor chamber during plasma processing. In such embodiments, the parts are preferably only subjected to the cleaning step.

Figure 7:
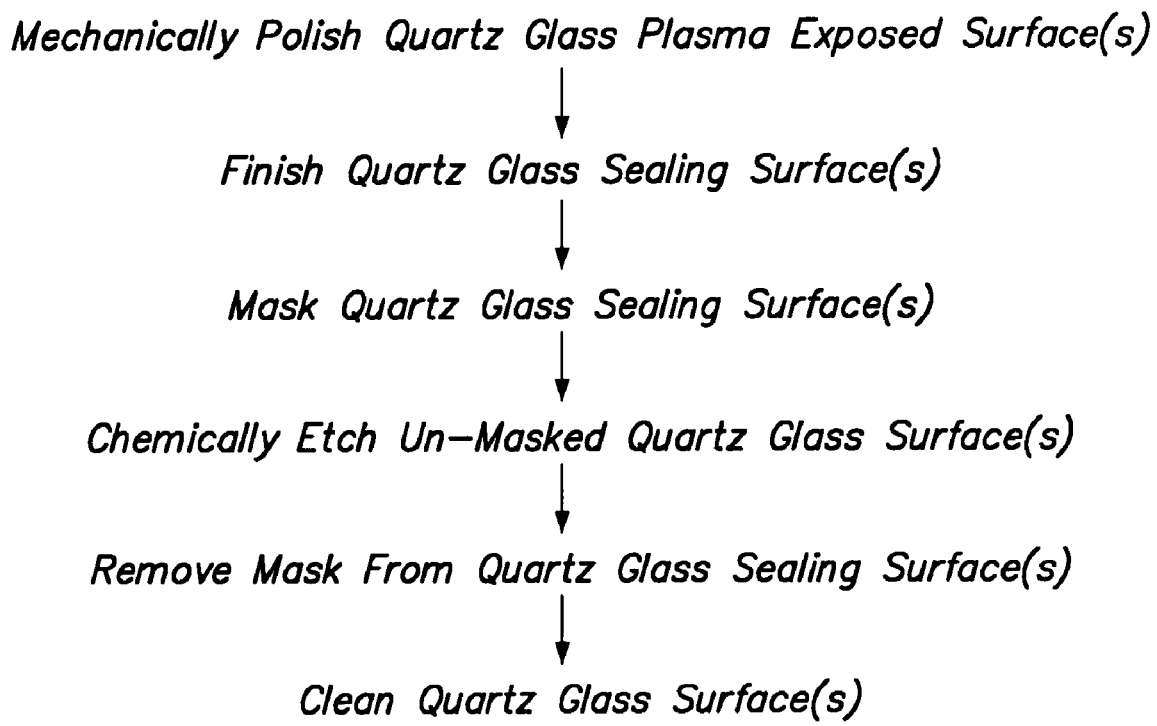
FIG. 7 shows a flow chart of a second preferred embodiment of a quartz glass finishing process.

FIG. 7 shows the steps of a second preferred embodiment of a method of surface finishing quartz glass. The method can be performed to finish one or more plasma-exposed quartz glass surfaces, and one or more quartz glass vacuum sealing surfaces, of a quartz glass component for a plasma reactor. Components that may have plasma-exposed surfaces and vacuum sealing surfaces include, gas injectors, view ports, and dielectric windows for plasma reactors, for example.

As shown in FIG. 7, the second preferred embodiment includes mechanically polishing one or more surfaces of the quartz glass component, as in the first preferred embodiment described above.

Figure 8:
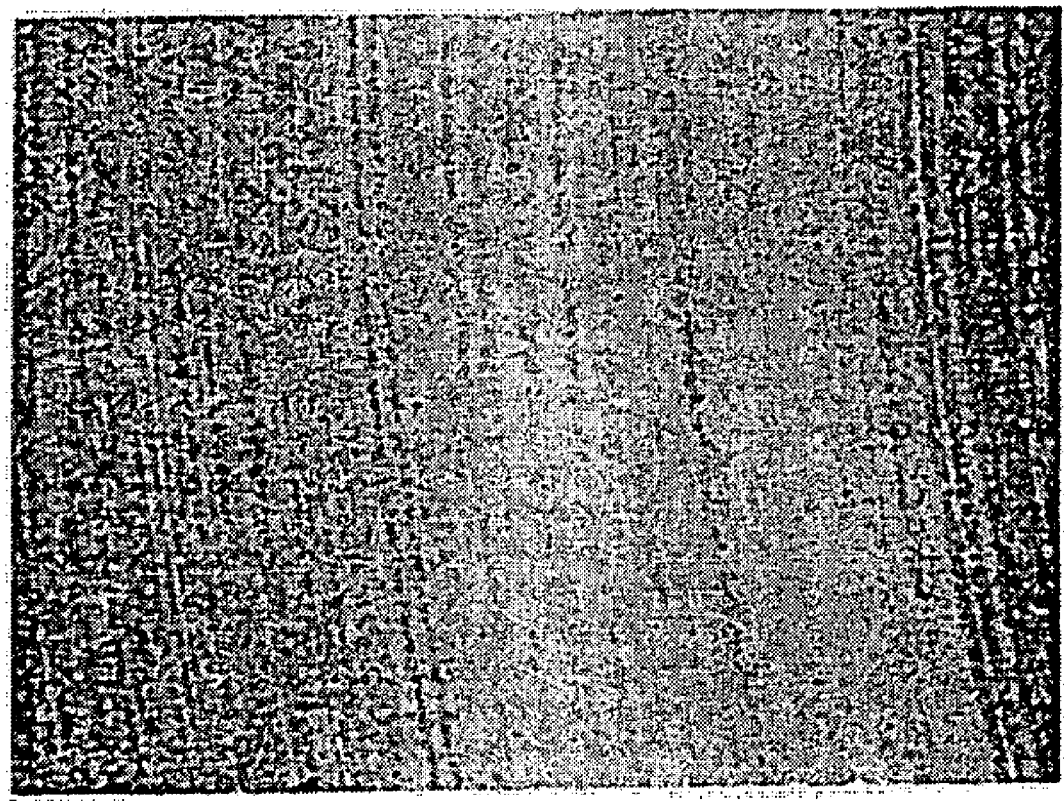
FIG. 8 shows a slurry-ground sealing surface of a quartz glass component.

In the second preferred embodiment, one or more quartz glass sealing surface are finished to a desired finish. FIG. 8 shows an exemplary finish of a surface that can be formed on a quartz glass component by mechanical polishing (e.g., slurry grinding). The mechanical polishing process produces a sealing surface having a concentric circular pattern of grooves. The concentric grooves reduce, and preferably prevent, the passage of air to maintain desired vacuum integrity at the sealing surface.

According to the second preferred embodiment, one or more mechanically polished sealing surfaces of the quartz glass component are masked prior to the etching step to prevent the sealing surface(s) from also being etched. Accordingly, the etching step is performed to etch surfaces of the component other than the sealing surface(s). The sealing surface(s) of the quartz glass component can be masked using any suitable masking material, such as a contaminant-free tape and/or wax.

In the second preferred embodiment, after the etch step, the mask is removed from the sealing surface(s) and the component is cleaned, as described above for the first preferred embodiment. The cleaning step removes metal contaminants from surfaces of the etched quartz glass component, including both sealing surfaces and non-sealing surfaces (i.e., plasma-exposed surfaces).

Figure 9:
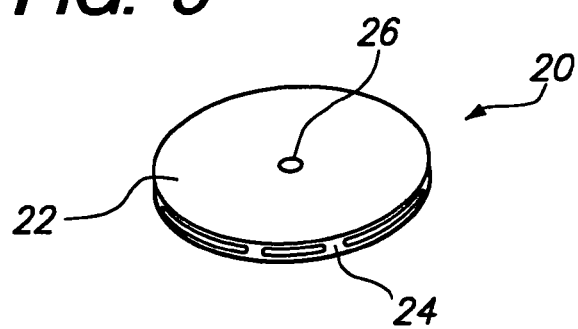
FIG. 9 shows a dielectric window including plasma-exposed and sealing surfaces that can be treated by the quartz glass finishing method.
Figure 10:
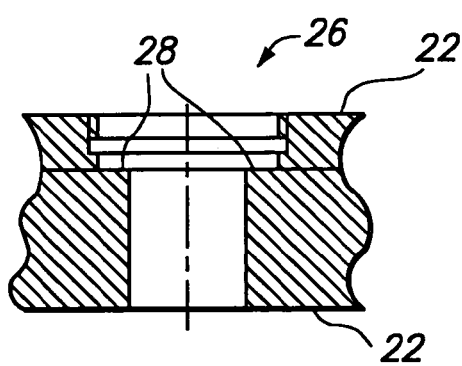
FIG. 10 is an enlarged partial view of the dielectric window shown in FIG. 9.

FIGS. 9 and 10 show an exemplary dielectric window 20 including parallel planar surfaces 22, a side surface 24, and a through passage 26. FIG. 10 is an enlarged view of the passage 26, showing a vacuum sealing surface 28 and plasma-exposed planar surfaces 22. The vacuum sealing surface 28 can be an O-ring sealing surface, for example. The dielectric window 20 can have more than one sealing surface. Dielectric windows made of quartz glass, such as the dielectric window 20, can be finished by the following preferred procedure.

Plasma-exposed planar surfaces of the dielectric window 20 (for example, planar surfaces 22) are machined and mechanically polished. The mechanically polished, plasma-exposed surfaces preferably have a $R_a$ value of about 5-20 microinches (0.125-0.5 microns), more preferably about 12-20 microinches (0.3-0.5 microns). The sealing surface 28 is masked.

The plasma-exposed surfaces are wet etched using a fluorine-containing etching liquid to achieve a desired surface morphology. For example, an HF etching solution can be used to achieve an $R_a$ value of about 20-100 microinches (about 0.5-2.5 microns), more preferably 30-50 microinches (about 0.75-1.25), for plasma-exposed surfaces. The etched plasma-exposed surfaces have a preferred ratio of the actual surface area to the nominal surface area of about 1.1-4, more preferably about 1.2-1.5. The characteristic feature length of the surface morphology of the plasma-exposed surfaces is preferably about 2-30 microns, more preferably about 5-20 microns. For example, the average feature length can be about 10 microns for the plasma-exposed surfaces.

The sealing surface 28, which is not etched, is polished to a preferred $R_a$ value of about 10-20 microinches (0.25-0.5 microns). The surface area of the sealing surface is not of concern because it is not a plasma-exposed surface. The characteristic feature length of the sealing surface is preferably about 5-25 microns.

The masking is removed from the sealing surface 28 and the dielectric window 20 is cleaned to remove metal contaminants from the plasma-exposed surfaces and other surfaces. The cleaning step reduces the metal level of the cleaned surfaces of the dielectric window for one or more of Al, B, Ca, Cr, Cu, Fe, Li, Mg, Ni, K, Na, Ti, and Zn preferably to less than about $1,000 \times 10^{10}$ atoms/cm$^2$, more preferably less than about $100 \times 10^{10}$ atoms/cm$^2$, and most preferably less than about $10 \times 10^{10}$ atoms/cm$^2$.

Figure 11:
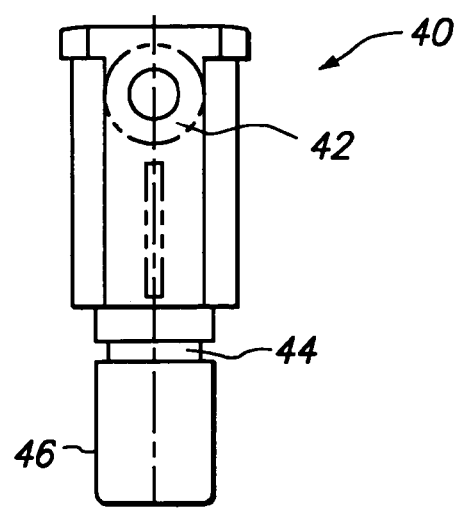
FIG. 11 shows a gas injector including plasma-exposed and sealing surfaces that can be treated by the quartz glass finishing method.

As another example, FIG. 11 shows a gas injector 40 including vacuum sealing surfaces 42, 44, and a plasma-exposed surface 46. The gas injector 40 also includes inner plasma-exposed surfaces, such as an inner bore (not shown). The vacuum sealing surfaces 42, 44 can be O-ring sealing surfaces, for example. The gas injector can include other sealing surfaces (not shown). Gas injectors made of quartz glass, such as the gas injector 40, can be finished by the following preferred procedure.

The plasma-exposed surface 46 is machined and subjected to mechanical polishing to achieve an $R_a$ value of about 7-20 microinches (0.025-0.5 microns), more preferably about 7-12 microinches (0.075-0.3 microns). The plasma exposed surface 46 of the gas injector 40 is sufficiently small so that it does not significantly affect plasma chemistry. Accordingly, the plasma-exposed surface 46 preferably is as smooth as possible after machining to allow the removal of damaged surface material at desirably low HF concentrations and etching times during the etching step.

The plasma-exposed surface 46 can be etched using a fluorine-containing etching liquid, such as an HF etch solution, to achieve a desired surface finish. For example, the surface can have an $R_a$ value of about 1-100 microinches (about 0.025-2.5 microns), more preferably 40-60 microinches (about 1-1.5 microns). The gas injector outer surface is as smooth as possible after etching. The HF concentration and etching time can be varied to achieve a desired plasma-exposed surface smoothness.

The sealing surfaces 42, 44 are polished to an $R_a$ value preferably of about 12-20 microinches (0.3-0.5 microns). The characteristic feature length of the sealing surfaces 42, 44 is preferably about 5-25 microns.

The masking is removed from the sealing surfaces 42, 44 and the gas injector 40 is cleaned to remove metal contaminants from the outer surface. The cleaning step reduces the surface metal contamination level of the gas injector 40 for one or more of Al, B, Ca, Cr, Cu, Fe, Li, Mg, Ni, K, Na, Ti, and Zn preferably to less than about $1,000 \times 10^{10}$ atoms/cm$^2$, more preferably less than about $100 \times 10^{10}$ atoms/cm$^2$, and most preferably less than about $10 \times 10^{10}$ atoms/cm$^2$.

Accordingly, preferred embodiments of the methods of finishing quartz glass can be used to finish components for plasma processing apparatuses having various sizes and shapes, and to provide different surface finishes at different surfaces of the components. Preferred embodiments of the methods can provide plasma-exposed surfaces having improved particle performance for plasma reactors, as well as sealing surfaces having high vacuum integrity, on the same components.

While the invention has been described in detail with reference to specific embodiments thereof, it will be apparent to those skilled in the art that various changes and modifications can be made, and equivalents employed, without departing from the scope of the appended claims.

What is claimed is:

1. A method of surface finishing a component for a plasma processing apparatus, comprising:
    mechanically polishing at least one plasma-exposed quartz glass surface of a component for a plasma processing apparatus;
    chemically etching the mechanically polished quartz glass surface with a fluorine-containing etching liquid; and
    cleaning the etched quartz glass surface with a cleaning liquid to remove metal contaminants from the surface;

wherein the finished quartz glass surface reduces the incidence of quartz and metal particulate, and molecular metal contamination when used in the plasma processing apparatus, wherein the mechanical polishing comprises (i) mechanically polishing at least one plasma-exposed quartz glass surface to a first surface morphology, and (ii) mechanically polishing at least one vacuum sealing quartz glass surface of the component to a second surface morphology different from the first surface morphology.

2. The method of claim 1, wherein the vacuum sealing quartz glass surface has a concentric circular pattern of grooves after the mechanical polishing.

3. The method of claim 1, further comprising:

masking the vacuum sealing quartz glass surface before the chemical etching;

removing the masking from the vacuum sealing quartz glass surface after the etching; and cleaning the vacuum sealing quartz glass surface with the cleaning liquid.

4. The method of claim 1, wherein:

the component is a dielectric window;

the plasma-exposed quartz glass surface is chemically etched to produce at least one of (i) an arithmetical mean roughness $R_a$ of about 5-20 microinches, (ii) a ratio of actual surface area/nominal surface area of about 1.1-4, and (iii) a characteristic feature length of about 2-30 microns; and the vacuum sealing quartz glass surface is not chemically etched, and after mechanical polishing has at least one of (i) an arithmetical mean roughness $R_a$ of about 10-20 microinches and (ii) a characteristic feature length of about 5-25 microns.

5. The method of claim 1, wherein:

the component is a gas injector;

the plasma-exposed quartz glass surface is chemically etched to produce an arithmetical mean roughness $R_a$ of about 1-100 microinches; and the vacuum sealing quartz glass surface is not chemically etched, and after the mechanical polishing has an arithmetical mean roughness $R_a$ of about 12-20 microinches.

6. A method of surface finishing a component for a plasma processing apparatus, comprising:

mechanically polishing at least one plasma-exposed quartz glass surface of a component for a plasma processing apparatus;

mechanically polishing at least one vacuum sealing quartz glass surface of the component;

masking the vacuum sealing quartz glass surface;

chemically etching the mechanically polished, plasma-exposed quartz glass surface with a fluorine-containing etching liquid; and cleaning the etched quartz glass plasma-exposed surface and the vacuum sealing quartz glass surface with a cleaning liquid to remove metal contaminants therefrom;

wherein the quartz glass plasma-exposed surface has a different surface morphology than that of the vacuum sealing surface after the cleaning.

7. A method of etching a semiconductor substrate in a plasma processing apparatus, comprising:

installing at least one component that has been surface finished by the method according to claim 6 in a plasma chamber of a plasma processing apparatus; and plasma etching at least one semiconductor substrate in the plasma chamber.

8. The method of claim 7, further comprising plasma conditioning the component for less than about one-half hour before plasma etching the semiconductor substrate.

9. The method of claim 4, wherein the plasma-exposed quartz glass surface is chemically etched to produce at least one of (i) an arithmetical mean roughness $R_a$ of about 12-20 microinches, (ii) a ratio of actual surface area/nominal surface area of about 1.2-1.5, and (iii) a characteristic feature length of about 5-20 microns.

10. The method of claim 5, wherein the plasma-exposed quartz glass surface is chemically etched to produce an arithmetical mean roughness $R_a$ of about 40-60 microinches.

* * * * *